United States Patent [19]

Lindsay

[11] 4,019,299
[45] Apr. 26, 1977

[54] FLOOR FRAME ASSEMBLY FOR A MOBILE BUILDING

[76] Inventor: Frederick H. Lindsay, Rte. 1, Box 71, Darwin, Minn. 55324

[22] Filed: Apr. 2, 1976

[21] Appl. No.: 673,208

Related U.S. Application Data

[62] Division of Ser. No. 560,792, March 21, 1975.

[52] U.S. Cl. .............................. 52/648; 280/106 R; 280/106 T; 296/28 F
[51] Int. Cl.² ...................... B62D 21/00; B60P 3/32
[58] Field of Search ............ 52/690, 648, 695, 693, 52/691, 692, 694; 280/106 R; 296/28 F

[56] References Cited

UNITED STATES PATENTS

| | | | |
|---|---|---|---|
| 3,254,914 | 6/1966 | Steck | 280/106 R |
| 3,716,267 | 2/1973 | Lindsay | 296/23 R |
| 3,738,678 | 6/1973 | King | 296/28 F |

*Primary Examiner*—John E. Murtagh
*Attorney, Agent, or Firm*—Woodard, Weikart, Emhardt & Naughton

[57] ABSTRACT

An improved floor frame assembly incorporated into a mobile building. A pair of identical frame assemblies form the floor of the building each including a plurality of middle beams mounted to and atop lower beams and further including a pair of adjacent interior sidewalls attached to the middle beams and extending therebeneath being adjacent the lower beams. The exterior sidewalls are mounted to the frame assemblies. Wheeled carriages are removably mountable to the assemblies facilitating transportation of the assemblies to a building site. A skirt is permanently mounted externally to the sidewalls and extends adjacent the floor assembly. A bracket is connected to the middle beam and the bottom beam of each frame assembly and in addition is connected to a pole which supports the adjacent middle portions of the frame assemblies. The interior sidewalls are slidably received in the bracket. In an alternate embodiment, the floor frame assembly is incorporated into a floor joist.

2 Claims, 7 Drawing Figures

FLOOR FRAME ASSEMBLY FOR A MOBILE BUILDING

This is a division, of application Ser. No. 560,792, filed Mar. 21, 1975.

BACKGROUND OF THE INVENTION

1. Field of the Invention

This invention is in the field of building construction.

2. Description of the Prior Art

In my U.S. Pat. No. 3,716,267, I have disclosed a unified floor frame assembly for use in constructing a building. The particular construction of the floor frame assembly provides for a much stronger and relatively lower cost construction. In addition, a skirt is provided which is permanently mounted to the mobile home at the time of positioning the mobile home on location. The skirt conceals the various items, such as, the mobile home wheels, plumbing and ducts as well as other items beneath the home.

Since the introduction in the market of the mobile home disclosed in my aforementioned patent, I have discovered various improvements to the construction. One improvement is the addition of cross braces in the floor frame assembly thereby considerably increasing the strength of the construction. In addition, I have added vertical members within the floor frame assemblies as well as changed certain lengths of various horizontal beams. A second improvement has been the addition of a second floor frame assembly adjacent an identical floor frame assembly to increase the size of the building while maintaining the strength of the construction. The external edge portions of the adjacent floor frame assemblies are supported by foundation; however, the adjacent interior edges of the adjacent floor frame assemblies must be connected or supported to provide proper structural integrity. In one embodiment, I have provided a bracket connected to the adjacent edge portions of the floor frame assemblies with the bracket in turn being supported by means such as a pole. The improved floor frame assembly in addition to being used in a building construction may also be used as a floor joist for supporting various stacked items.

SUMMARY OF THE INVENTION

One embodiment of the present invention is a building comprising first and second unified floor frame assemblies having adjacent portions, the assemblies each including a plurality of parallel lower beams and a plurality of middle beams mounted to and atop the lower beams, the assemblies further including a pair of adjacent interior sidewalls attached to the middle beams and extending therebeneath being adjacent the lower beams, exterior sidewalls mounted to the assemblies, wheeled carriages removably mounted to the assemblies facilitating transportation of the assemblies to a building site, a skirt permanently mounted externally to the sidewalls and extending adjacent the floor assemblies, supporting means connected to the assemblies at the adjacent portions operable to support the assemblies and connecting means connected to the middle beams and the bottom beams and to the supporting means, the connecting means sidably receiving the interior sidewalls.

Another embodiment of the present invention is a floor joist comprising a plurality of horizontal lower beams with opposite ends, a plurality of vertical members mounted to and atop the lower beams, a plurality of horizontal upper beams mounted to and atop the vertical members, the upper beams have ends located outwardly of the ends of the lower beams, a plurality of cross braces with opposite ends attached to the vertical members, the cross braces being attached to the lower beams and extending upwardly and outwardly toward the ends of the upper beams being attached to the upper beams, a pair of floor runners extending perpendicular to the lowr beams and being in contact with the ends of the lower beams, vertical supports extending down from the ends of the upper beams and resting atop the floor runners, end walls extending between the upper beams and the lower beams, and a floor mounted atop and to the upper beams providing a support surface for receiving stacked items thereatop.

A third embodiment of the present invention is a bracket comprising a plate with opposite side edges and opposite end edges, a first upstanding wall and a second upstanding wall fixedly mounted to the plate, each upstanding wall includes a vertical wall extending from one side edge of the plate partially toward the opposite side edge of the plate but terminating at a location intermediate the opposite side edges, the vertical wall of the first upstanding wall is spaced apart from the vertical wall of the second upstanding wall, the first upstanding wall includes a horizontal wall cantileveredly connected to the vertical wall of the first upstanding wall, the horizontal wall extending outwardly of one of the opposite end edges of the plate, the second upstanding wall includes a second horizontal wall cantileveredly connected to the vertical wall of the second upstanding wall, the second horizontal wall extending outwardly of one of the opposite end edges of the plate.

It is an object of the present invention to provide a new and improved floor frame assembly for a mobile building.

Likewise, an object of the present invention is to provide a new and improved mobile building.

A further object of the present invention is to provide a new and improved floor joist for supporting items stacked thereatop.

In addition, an object of the present invention is to provide a new and improved bracket for connecting various structural members together.

Related objects and advantages of the present invention will be apparent from the following description.

DESCRIPTION OF THE PREFERRED EMBODIMENTS

Figure 1:
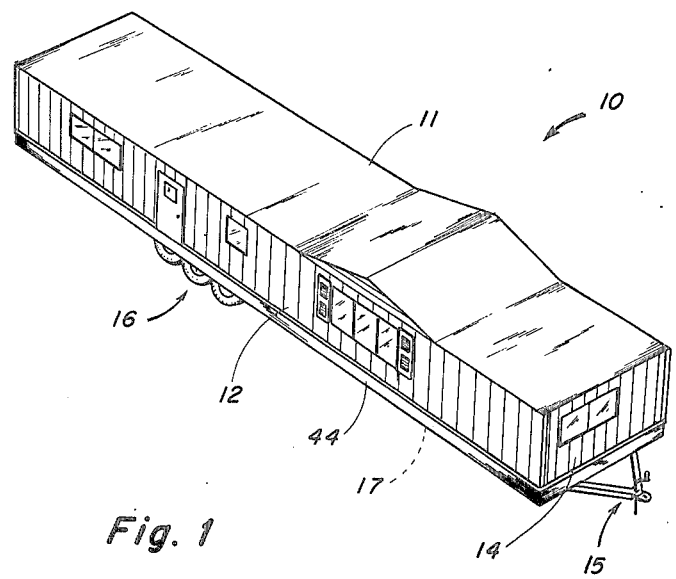
FIG. 1 is a perspective view of a mobile building incorporating the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a mobile building 10 including a roof 11 mounted atop a pair of sidewalls 12 and a pair of end walls 14. Building 10 is provided with a wheeled carriage 16 to facilitate the transportation of the building when attached to a pulling vehicle by hitch 15. Both carriage 16 and hitch 15 are removed after the building 10 is located on site.

Figure 2:
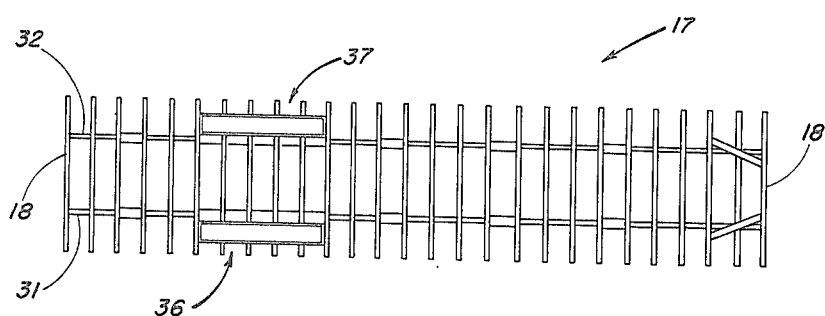
FIG. 2 is a bottom plan view of the building of FIG. 1.

Building 10 is provided with a unified floor frame assembly 17 (FIGS. 2 and 3) which includes a plurality of parallel horizontal lower beams 18 having opposite ends 19 and 20. A plurality of vertical members 21 and 22 are mounted respectively to each end 19 and 20 of lower beams 18. In addition, a plurality of vertical members 23 and 24 are mounted to each beam 18 at locations inwardly of the opposite ends of beams 18. A plurality of horizontal parallel upper beams 25 are mounted to the top ends of vertical beams 21 through 24 being positioned over and vertically aligned with the plurality of lower beams 18. The opposite ends 26 and 27 of upper beams 25 extend outwardly beyond ends 19 and 20 of lower beams 18 and likewise extend outwardly beyond vertical end members 21 and 22.

A variety of means may be utilized to secure vertical members 21 through 24 to the lower beams 18 and upper beams 25. For example, the vertical members may be glued to the horizontal beams or may be secured by conventional fastening devices such as by plates 28 having a plurality of nails extending therefrom into the wooden beams and wooden vertical members. In order to increase the strength of the frame, a pair of cross braces 29 and 30 are fastened and connected to each lower beam 18 and upper beam 25. For example, cross brace 29 extends from the intersection of beam 18 and vertical member 23 upwardly and outwardly toward the intersection of member 21 and upper beam 26. Likewise, cross brace 30 extends from the intersection of member 24 and beam 18 upwardly and outwardly to the intersection of member 22 and upper beam 25. The cross braces are fixedly attached to the vertical members 21 through 24 as well as to the lower beams 18 and upper beams 25. Two cross braces 29 and 30 are provided for each set of upper beams 25 and lower beams 18. Likewise, four vertical braces 21 through 24 provided for each pair of upper beams 25 and lower beams 18.

Two steel I-beams 31 and 32 extend through frame 17 resting atop the lower beams 18 and positioned immediately inward and adjacent vertical members 23 and 24. The I-beams are secured to the lower beams 18 by conventional fastening devices. A sheet of plastic may be positioned atop the lower beams 18 so as to extend the length and width of the building. The plastic sheet may extend beneath I-beams 31 and 32 and is provided to insulate the interior of the building from undesirable elements. In one embodiment, staples are used to secure the plastic sheet to the lower beams 18. The I-beams 31 and 32 extend the length of the building and are metal as compared to the remaining wooden components of the frame. A metal cross brace 33 and metal brackets 34 and 35 are attached to I-beams 31 and 32 forming the trailer hitch 15 for attaching the mobile building to a towing vehicle.

Two wheel wells 36 and 37 (FIG. 2) are provided in the floor frame assembly for receiving the wheels of the wheel carriage 16. Wheel wells 36 and 37 are identical to the wheel wells 52 and 53 disclosed in my U.S. Pat. No. 3,716,267, entitled UNIFIED FLOOR FRAME ASSEMBLY WITH SKIRT FOR A MOBILE BUILDING which is hereby incorporated by reference.

Sidewalls 12 are mounted top beams 25 (FIG. 3) and extend upwardly toward the roof 11 of the building. As distinguished from the building disclosed in my aforementioned patent, the sidewalls 12 disclosed herein do not extend beneath the upper beams 25. A floor covering such as a piece of plywood is affixed to the top surfaces of beams 25 extending between sidewalls 12. The wheeled carriage 16 is attached to suitable tubing as disclosed in my aforementioned patent and may be quickly and easily removed and returned to the manufacturer for the transportation of another mobile building. The tubing secured to the I-beams alleviate the necessity for mounting the mobile building atop cement blocks since the building may be set immediately atop a slab being supported by the tubes. When the wheeled carriage is removed from the mobile home, a skirt extends down to the ground concealing the plumbing, etc., beneath the building.

Cross braces 29 and 30 extend in a diagonal direction from beam 18 and members 23 and 24 upwardly and outwardly toward the ends of upper beams 25. Beams 25 overhang members 21 and 22 thereby providing a space beneath the upper beams to receive strengthening beams 38-41. Beam 39 is attached to the outer ends 19 of lower beams 18 and to members 21. Beam 38 in turn is attached to beam 39. Likewise, a second pair of beams 40 and 41 are positioned at the opposite end of beam 18 being located beneath upper beams 25 and secured thereto. Beam 40 is attached to the outer ends 20 of lower beams 18 whereas beam 41 is attached to beam 40. Suitable coverings 42 and 43 are mounted atop beams 38 and 41 and are attached to the outer ends 26 and 27 of upper beams 25. A skirt 44 (FIG. 1) is permanently mounted exteriorly to sidewalls 12 and extends adjacent beams 38 and 41.

Figure 3:
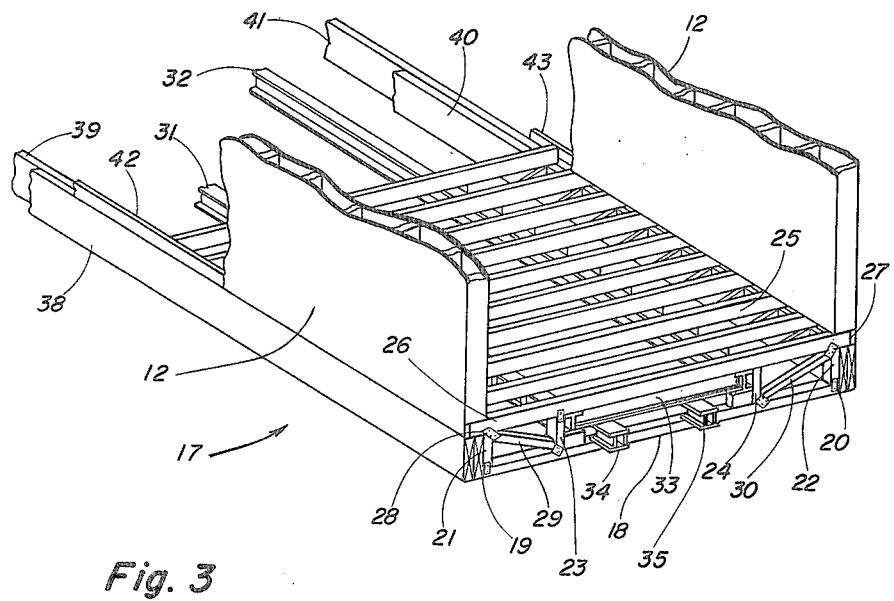
FIG. 3 is an enlarged fragmentary perspective view of one embodiment of the floor frame assembly.
Figure 4:
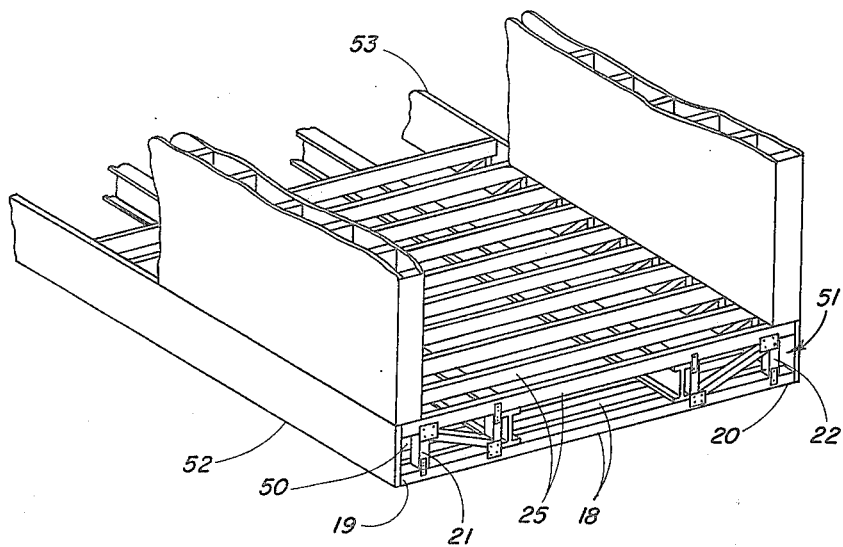
FIG. 4 is the same view as FIG. 3 only showing an alternate embodiment of the floor frame assembly.

In the alternate embodiment of the frame assembly shown in FIG. 4, the opposite ends 19 and 20 of the lower beams 18 are located directly beneath the opposite ends of the upper beams 25. Thus, a storage space 50 and 51 is provided between respectively vertical member 21 and cover 52 and between vertical member 22 and cover 53. In the embodiment of the frame shown in FIG. 4, the frame assembly is not provided with the lengthwise extending beams 38 and 41. Vertical members 21 and 22 are spaced inwardly of the external ends of the upper and lower beams providing a storage space for the routing of various wiring and plumbing. Storage spaces 50 and 51 extend the length of the building. The cover walls 52 and 53 are mounted to the external ends of the upper and lower beams and extend the length of the building enclosing the storage spaces. Skirt 44 is then located externally adjacent cover walls 50 and 51. The remaining portion of the frame shown in FIG. 4 is identical to the frame shown in FIG. 3.

Figure 5:
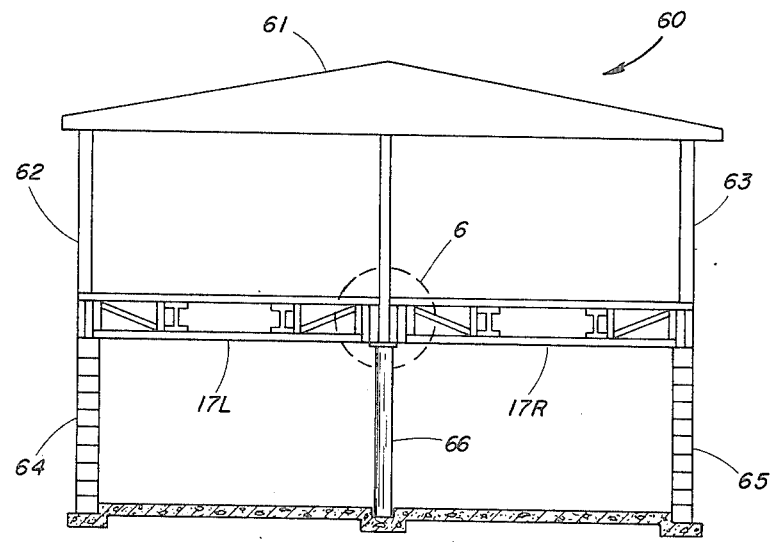
FIG. 5 is a cross-sectional view of a building incorporating two floor frame assemblies.
Figure 6:
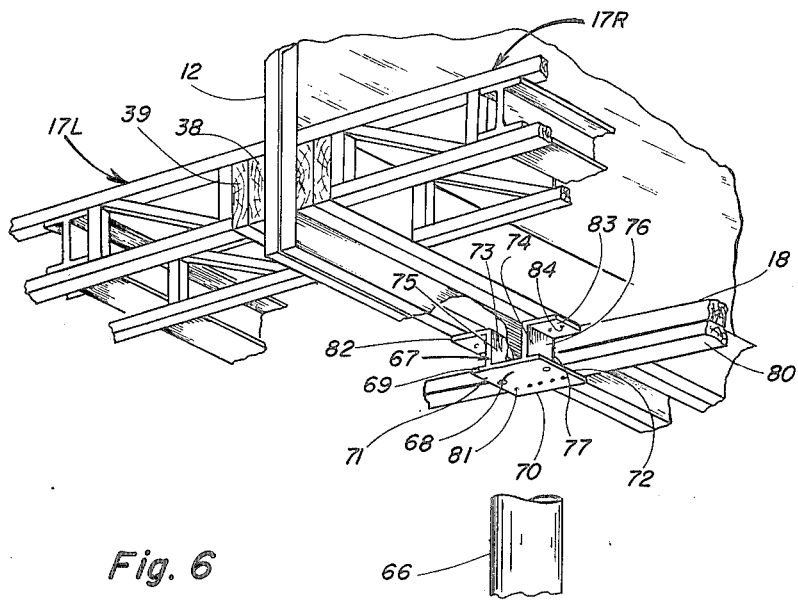
FIG. 6 is a fragmentary bottom perspective view of the bracket used to secure the adjacent floor frame assemblies shown in FIG. 5 to a supporting pole.

Building 60 shown in FIG. 5 includes a pair of floor frame assemblies 17L and 17R identical to the frame assembly shown in FIG. 3. Building 60 includes a roof 61, a pair of sidewalls 62 and 63 and a pair of end walls not shown. The outer ends of assemblies 17 are supported by foundations 64 and 65 whereas the inner ends of frame assembly 17 are supported by a pole 66. A bottom view of the frame assemblies and pole 66 is shown in FIG. 6.

Bracket 67 is provided for attaching pole 66 to the left frame assembly 17L and the right frame assembly 17R. The prior description of frame assembly 17 shown in FIG. 3 applies identically to frame assemblies 17L and 17R. Bracket 67 includes a metal plate 68 with opposite side edges 69 and 70 opposite end edges 71 and 72. A pair of upstanding walls 73 and 74 are fixedly mounted atop and to plate 68. Each upstanding wall 73 and 74 includes a vertical wall 75 and 76 which extend from edge 69 of plate 68 partially across the top surface of plate 68 terminating short of edge 70. That is, one edge of upstanding walls 73 and 74 terminates betwen opposite edges 69 and 70 of plate 68. For example, edge 77 of wall 76 terminates between edges 69 and 70.

Each frame assembly 17L and 17R includes a wooden runner 80 attached to the bottom surface of the lower beam 18. As shown in FIG. 6, beam 18 terminates adjacent strengthening beam 39 with beam 18 mounted atop wooden runner 80 which in turn rests atop plate 68 being secured thereto by fastening devices 81. Pole 66 is then connected to plate 68 by conventional fastening devices.

Walls 73 and 74 are spaced apart to slidably receive interior sidewalls 12 of frame assemblies 17L and 17R. In addition, each upstanding wall 73 and 74 includes a horizontal wall 82 and 83 cantileveredly connected to and integral with walls 75 and 76. Shelves or walls 82 and 83 extend beneath and are in contact with strengthening beam 38 and 39 being secured thereto by fasteners 84.

In one embodiment, plate 68 is five inches wide and five inches long with walls 75 and 76 being spaced apart one and 5/16 inches and with shelves 82 and 83 being spaced three inches above plate 68. Each shelf has a length of three inches. That is, shelf 83 extends three inches from wall 76. Likewise, shelf 82 extends three inches from wall 75. The overall width of each shelf is three inches extending from edge 69 to approximately two inches from edge 70.

In order to install bracket 67, the bracket is moved upwardly thereby slipping interior sidewalls 12 between walls 75 and 76. The shelves of the bracket are then secured to strengthening beams of each frame 17L and 17R. Runner 80 of frame assembly 17L and runner 80 of frame assembly 17R are then secured to the bottom plate of the bracket.

Figure 7:
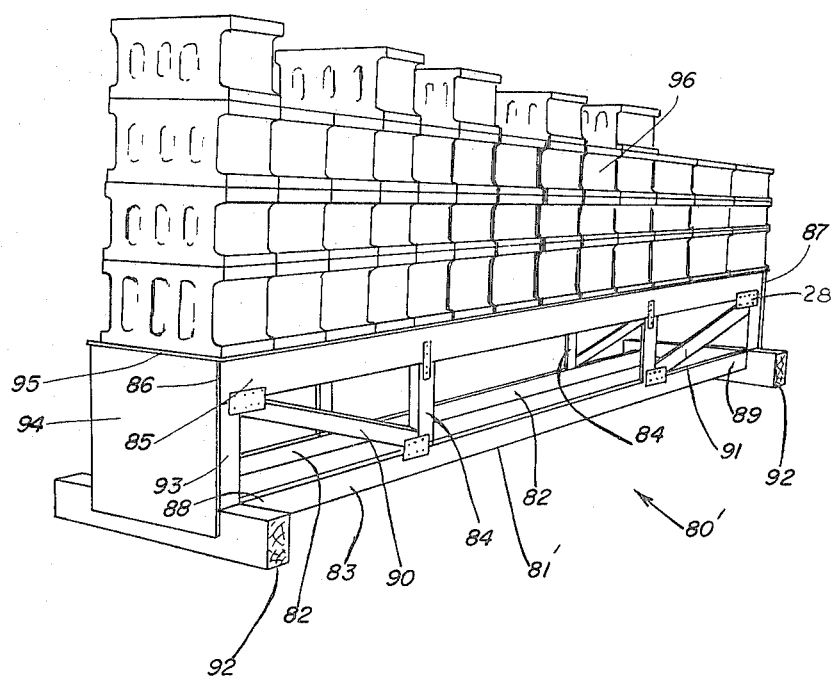
FIG. 7 is a perspective view of a floor joist incorporating the principles of the floor frame assembly.

Floor joist 80' shown in FIG. 7 incorporates a floor frame assembly 81' similar to the floor frame assembly 17 shown in FIG. 3. Frame 81' includes a plurality of horizontal lower beams 82 and 83 with opposite ends. A plurality of vertical members 84 are mounted to and atop the lower beams 82. A plurality of horizontal upper beams 85 are mounted to and atop the vertical members 84. The upper beams have ends 86 and 87 which are located outwardly of the ends 88 and 89 of the lower beams 82. A plurality of cross braces 90 and 91 with opposite ends are attached to the vertical members 84. Likewise, the cross braces are attached to the lower beams and extend upwardly and outwardly toward ends 86 and 87 of the upper beams. The cross braces are attached to the lower beams as well as to the upper beams. A pair of floor runners 92 extend perpendicular to the lower beams 82 and are in contact with the ends of the lower beams. Vertical supports 93 extend downwardly from the ends of the upper beams 85 and rest atop the floor runners 92. A pair of end walls 94 are added to the opposite ends of the floor joists and extend from the upper beams to the lower beams. A floor 95 is mounted atop the upper beams providing a support surface for receiving stacked articles 96 thereatop.

As shown in FIG. 7, the lower beams are spaced upwardly from the ground by the runners 92. The floor joist has a length extending in the direction of the lengths of the lower beams and the upper beams with the cross braces 90 being located at the opposite end portions of the floor joist. Each cross brace has a length less than one-third the length of the floor joist. Thus, the floor joist is unsupported in the center portion thereof. The cross braces are located only in the opposite outer one-third portions of the floor joist providing excellent strength for the construction. In lieu of utilizing poly 66 and bracket 67, the adjacent edge portions of assemblies 17L and 17R may be bolted or secured together.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

The invention claimed is:

1. A floor joist comprising:

a plurality of horizontal lower beams with opposite ends;

a pluraity of vertical members mounted to and atop said lower beams;

a plurality of horizontal upper beams mounted to and atop said vertical members, said upper beams have ends located outwardly of said ends of said lower beams;

a plurality of cross braces with opposite ends attached to said vertical members, said cross braces being attached to said lower beams and extending upwardly and outwardly toward sad ends of said upper beams being attached to said upper beams;

a pair of floor runners extending perpendicular to said lower beams and being in contact with said ends of said lower beams, vertical supports extending down from said ends of said upper beams and resting atop said floor runners;

end walls extending between said upper beams and said lower beams; and, a floor mounted atop and to said upper beams providing a support surface for receiving stacked items thereatop.

2. The floor joist of claim 1 wherein:

said lower beams are spaced upwardly from ground by said floor runners;

said floor joist has a length extending in the direction of the length of said lower beams and said upper beams;

said cross braces each have a length less than one-third said length of said floor joist; and, said cross braces are located only in the outer one-third portions of said floor joist.

* * * * *